(12) United States Patent
Kimura

(10) Patent No.: US 8,158,284 B2
(45) Date of Patent: Apr. 17, 2012

(54) LITHIUM ION SECONDARY BATTERY

(75) Inventor: Naoki Kimura, Hitachi (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 585 days.

(21) Appl. No.: 12/354,039

(22) Filed: Jan. 15, 2009

(65) Prior Publication Data
US 2009/0220863 A1 Sep. 3, 2009

(30) Foreign Application Priority Data

Feb. 29, 2008 (JP) ................... 2008-048992

(51) Int. Cl.
H01M 4/13 (2010.01)
H01M 4/58 (2010.01)
C01B 31/00 (2006.01)
C01B 31/02 (2006.01)
C01B 31/04 (2006.01)

(52) U.S. Cl. .................. 429/231.8; 423/445 R; 423/448
(58) Field of Classification Search ............... 429/231.8; 423/445 R, 448
See application file for complete search history.

(56) References Cited

U.S. PATENT DOCUMENTS

| 5,908,715 | A  | * | 6/1999 | Liu et al. ................ 429/217 |
| 6,528,211 | B1 | * | 3/2003 | Nishimura et al. ........ 429/231.8 |
| 7,410,511 | B2 | * | 8/2008 | Ozaki et al. .................. 29/623.1 |
| 7,608,364 | B2 | * | 10/2009 | Nishiyama et al. ........ 429/231.8 |
| 2002/0061445 | A1 | * | 5/2002 | Kitagawa et al. .......... 429/231.8 |
| 2004/0247872 | A1 | * | 12/2004 | Sudo et al. ............... 428/402.24 |

FOREIGN PATENT DOCUMENTS

| JP | 07192724 A | * | 7/1995 |
| JP | 08-069819 | * | 3/1996 |
| JP | 10-036108 |   | 2/1998 |
| JP | 10-149830 | * | 6/1998 |
| JP | 2003-272627 |   | 9/2003 |
| JP | 2005-294011 |   | 10/2005 |
| JP | 2007-149619 | * | 6/2007 |

* cited by examiner

Primary Examiner — Patricia L Hailey
(74) Attorney, Agent, or Firm — Antonelli, Terry, Stout & Kraus, LLP.

(57) ABSTRACT

A lithium ion secondary battery is capable of improving the energy density and power density and excellent in high rate cycle characteristics applicable to hybrid cars, etc. The lithium ion secondary battery including a positive electrode of a lithium transition metal complex oxide, a negative electrode for absorbing/releasing lithium, and a non-aqueous electrolyte containing a lithium salt, in which the negative electrode has a negative electrode active material using a non-graphitizing carbon (spacing d(002) of 0.360 nm or more by XRD) and a graphitizing carbon (spacing d(002) of 0.339 nm or more and less than 0.360 nm by XRD) surface-modified at a thickness in a range from 10 nm to 100 nm in admixture, comprising the non-graphitizing carbon and the graphitizing carbon at a ratio in the range of 90 to 50 wt % : 10 to 50 wt % and, further, graphitizing carbon having a grain size larger than that of the non-graphitizing carbon is used.

8 Claims, 1 Drawing Sheet

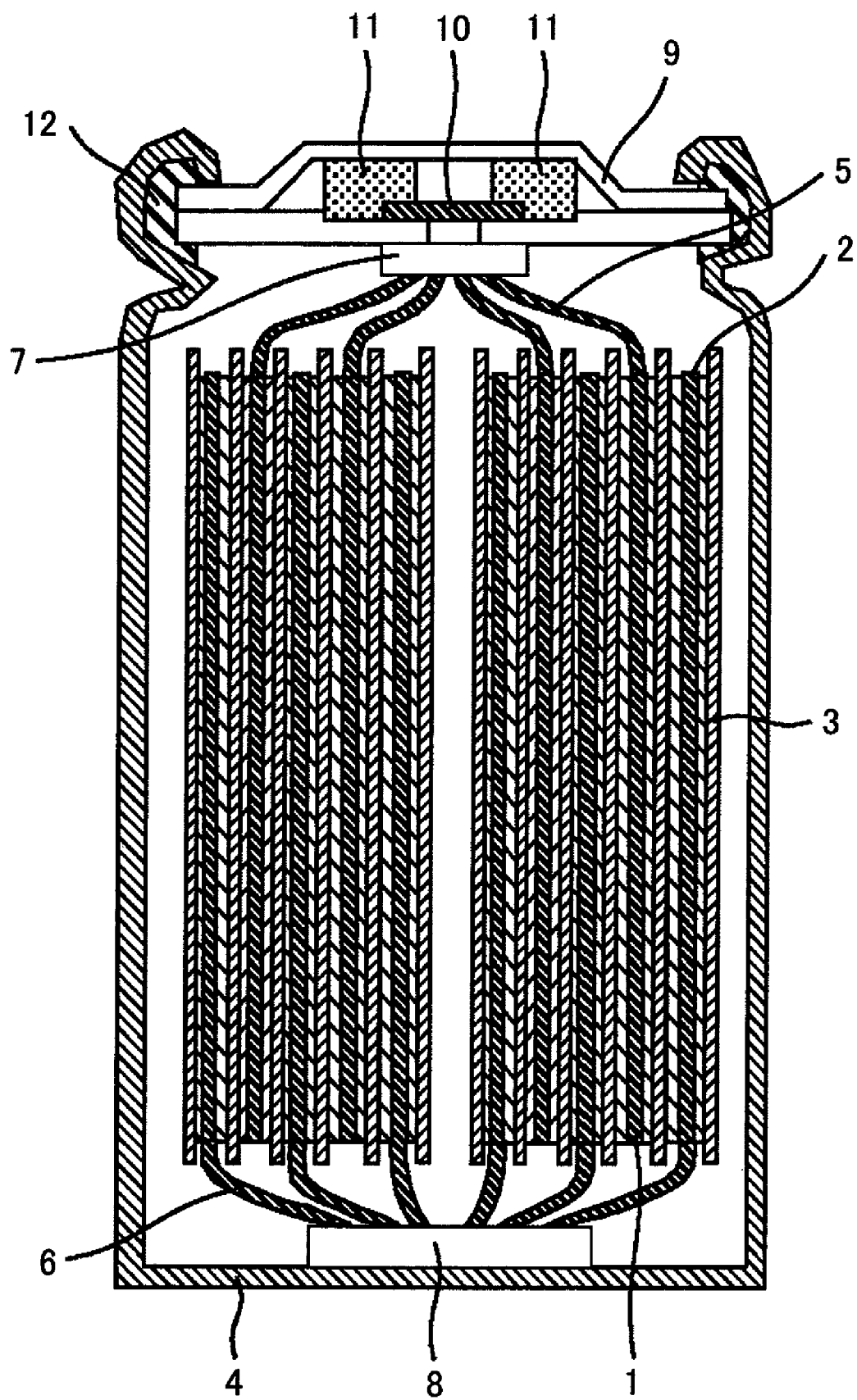

LITHIUM ION SECONDARY BATTERY

CLAIM OF PRIORITY

The present application claims priority from Japanese Patent Application No. 2008-048992 filed on Feb. 29, 2008, the content of which is hereby incorporated by reference into this application.

BACKGROUND OF THE INVENTION

1. Field of the Invention

The present invention relates to a lithium ion secondary battery.

2. Description of the Related Art

In recent years, advanced hybrid cars have been expected more with a view point of environmental problems such as reduction of carbon dioxide. Power source devices such as lithium ion secondary batteries or capacitors have been developed vigorously for application to hybrid cars, etc. Improving the power density and energy density of the power source devices is an important subject in the application of mounting them on cars such as hybrid cars. Further, so-called dual mode cars capable of running only by electric power in urban areas have also been demanded in recent years and, for coping with such a demand, not only high energy density and high power density but also cycle characteristics at a higher current have been demanded as the characteristics of batteries.

Generally, for batteries used in portable equipment such as personal computers and cellular phones, while high capacity characteristics are demanded but high rate cycle characteristics are not demanded. That is, utmost about ⅓ hour rate (3 C) is demanded as load characteristics.

On the other hand, in the field of cars, an hour rate of about 1/10 (10 C), that is, a high current about three times as large as that in the battery applied for portable equipment is required and, cycle characteristics are also required. With the situations described above, it is an extremely important subject to provide a battery having high energy density, high power density and, further, high current cycle (high rate cycle) characteristics as the life time characteristics for putting the batteries to practical use in the field of hybrid cars, etc.

For attaining such a subject, negative electrode materials for lithium secondary batteries have been studied vigorously. Japanese Patent Unexamined Application No. Hei 10-36108, 2003-272627, and 2005-294011 disclose techniques of applying surface modification of a non-graphitizing carbon to the surface of graphite as the negative electrode material for the lithium secondary battery thereby improving the energy density.

The present invention intends to provide a lithium ion secondary battery excellent in the high rate cycle characteristics applicable to hybrid cars, etc. and improving the energy density and the power density.

SUMMARY OF THE INVENTION

The present invention provides a lithium ion secondary battery in which a positive electrode of absorbing/releasing lithium and a negative electrode of absorbing/releasing lithium are forming a battery with an electrolyte, in which the negative electrode has an negative electrode active material, the negative electrode active material contains a non-graphitizing carbon and a graphitizing carbon which is coated on the surface with the non-graphitizing carbon, and the non-graphitizing carbon is in the range from 90 to 50 wt % and the graphitizing carbon is in the range from 10 to 50 wt % based on the total weight of the non-graphitizing carbon and the graphitizing carbon, with the total of them being 100%.

The average grain size of the graphitizing carbon is larger than the average grain size of the non-graphitizing carbon.

The graphitizing carbon has a surface modification layer containing the thin non-graphitizing carbon layer on the surface and the thickness of the layer is from 10 nm to 100 nm.

The spacing d(002) of the non-graphitizing carbon is 0.36 nm or more and the spacing d (002) of the graphitizing carbon is 0.339 or more and less than 0.360.

The present invention provides a lithium ion secondary battery with improved energy density or power density and, further, excellent in high rate cycle characteristics.

BRIEF DESCRIPTION OF THE DRAWING

FIG. 1 is a side elevational cross sectional view showing a lithium ion secondary battery according to the invention.

DETAILED DESCRIPTION OF THE PREFERRED EMBODIMENTS

The present invention is to be described specifically with reference to examples.

In a lithium ion secondary battery, selection for active materials constituting a most portion of a negative electrode is an extremely important factor for high rate cycle characteristics, increase of the energy density and increase of the power density of the battery. By forming the negative electrode active material with the non-graphitizing carbon, high rate cycle characteristics can be expected since the structure of graphene is at random in the non-graphitizing carbon and, accordingly, Li ions are easily absorbed and released.

However, for further improving the energy density and the power density, it is necessary to select a material of higher density for the negative electrode mix, that is, higher intrinsic density and of less irreversible capacity compared with the non-graphitizing carbon. Therefore, the surface modified graphitizing carbon is suitable for the material. Further, the material has to also have high rate cycle characteristics. Further, for improving the high rate cycle characteristics, the coating amount for the surface modification is preferably as less as possible.

For the negative electrode active material, a non-graphitizing carbon (spacing d(002) of 0.360 nm or more by XRD: X-Ray Diffraction measurement) and a graphitizing carbon (spacing d(002) of 0.339 nm or more and less than 0.360 nm by XRD) coated at the surface with a non-graphitizing carbon of 10 to 100 nm thickness are used in admixture.

Further, it is preferred to constitute the negative electrode active material with the non-graphitizing carbon and the graphitizing carbon at a weight of ratio in the range of 90 to 50 wt %:10 to 50 wt %.

Further, it is preferred that the average grain size of the graphitizing carbon is larger than the average grain size of the non-graphitizing carbon.

By coating the surface of the graphitizing carbon with the non-graphitizing carbon of 10 to 100 nm thickness, since the non-graphitizing carbon having random graphene structure portion on the surface is also utilized when the charge/discharge cycle is conducted at a high rate, the resistance is decreased and high rate cycle characteristics are improved.

Since a graphitizing carbon surface modified at a thickness of less than 10 nm shows no change, surface modification of 10 nm or more is necessary. Further, a graphitizing carbon surface modified at a thickness of 100 nm or more decreases the energy density due to increase of an irreversible capacity and, further, worsens the high rate cycle characteristics due to increase of the resistance.

The graphitizing carbon can maintain high rate cycle characteristics suitable to car-mounting application by mixing with the non-graphitizing carbon. Further, by the use of a mixed negative electrode of the non-graphitizing carbon and the graphitizing carbon, improvement in the energy density can be expected due to decrease of the irreversible capacity and improvement in the power density can be expected due to increase of the electrode area in the battery casing by the increase of the negative electrode mix density, which decreases the resistance as the initial characteristics.

However, when the mixing amount of the graphitizing carbon with relatively small negative electrode capacity exceeds 60%, +/− capacity ratio decreases to 1.0 or less when the limit minimum coating amount is constant and it cannot be utilized as a battery with a view point of safety regarding the generation of dendrites. Further, when increasing the mixing amount of the graphitizing carbon to 50 to 60% or more, the feature of the graphitizing carbon overcomes the feature of the non-graphitizing carbon, and worsening of high rate cycle characteristics is observed.

From the foregoings, it is preferred that the mixing amount of the graphitizing carbon is defined as the ratio of the non-graphitizing carbon compared with the graphitizing carbon is in the range 90 to 50 wt %:10 to 50 wt %.

Further, since the graphitizing carbon has a property that the grains are softer compared with those of the non-graphitizing carbon, no improvement for the density can be expected unless the grain size of the graphitizing carbon is larger than that of the non-graphitizing carbon. Since the improvement of the density lowers the resistance and leads to the improvement of the power density, relation between the size of the two type of grains is also an extremely important factor.

As has been described above, three factors, i.e., the coating thickness of the non-graphitizing carbon on the surface of the graphitizing carbon, the mixing amount of the graphitizing carbon, and the grain size are technical key points and when they are defined each within a preferred range, it is possible to provide a lithium ion secondary battery of high energy density and high power density while suppressing the decrease of the capacity during high rate cycles.

For the graphitizing carbon and the non-graphitizing carbon as the negative electrode active material of the invention, while general materials can be used, the invention is not restricted to those described below.

As the graphitizing carbon, cokes, small meso-carbon spheres, meso-phase pitch carbon, anisotropic pitch carbon, thermally decomposed gas phase grown carbon, etc. that are heat treated at about 1000° C. and which change their graphitization degrees (d(002) value by XRD) in accordance with heat treatment temperature can be used.

As the non-graphitizing carbon, PFA resin carbon, PAN resin carbon, anisotropic pitch carbon, glassy carbon, thermosetting resin, etc. which are carbonized under sintering by heat treatment and which show no change for the degree of graphitization (d(002) value by XRD) by heat treatment temperature can be used.

The method of surface coating the non-graphitizing carbon to the graphitizing carbon is not restricted and a general method can be used, such as depositing a starting material of a non-graphitizing carbon to the surface of a starting material for a graphitizing carbon and sintering them.

As the positive electrode active material, lithium transition metal complex oxides can be used. A positive electrode active material such as lithium nickalate or lithium cobaltate can be used by substituting a portion thereof such as Ni or Co with one or more transition metals. Generally, the positive electrode mix and the negative electrode mix contain a binder, a conductive agent, etc. in addition to the active material, but the effect of the invention is not deteriorated at all by the kind and the amount of them.

As the electrolyte, known electrolytes used generally in batteries that use carbonaceous materials, etc. as the negative electrode active material can be used and they include, for example, liquid organic electrolytes formed by dissolving, for example, at least one lithium salt selected, for example, from $LiPF_6$, $LiBF_4$, $LiClO_4$, $LiN(C_2F_5SO_2)_2$, etc. into at least one non-aqueous solvent selected, for example, from ethylene carbonate, propylene carbonate, butylene carbonate, dimethyl carbonate, ethyl methyl carbonate, diethyl carbonate, γ-butyrolactone, γ-valerolactone, methyl acetate, ethyl acetate, methyl propionate, tetrahydrofuran, 2-methyltetrahydrofuran, 1,2-dimethoxyethane, 1-ethoxy-2-methoxyethane, 3-methyltetrahydrofuran, 1,2-dioxane, 1,3-dioxane, 1,4-dioxane, 1,3-dioxolane, 2-methyl-1,3-dioxolane, and 4-methyl-1,3-dioxolane.

Further, when a finely porous separator is used in accordance with the necessity in view of the constitution of a battery, this does not deteriorate the effect of the invention.

The application use of the lithium ion secondary battery according to the invention is not particularly restricted and it is applicable, for example, to hybrid cars, electric cars, as well as applicable also as a power source for electric power tools that require high power density.

The present invention is not restricted to the examples to be described below.

EXAMPLE

A positive electrode mix was obtained by using $LiNi_{1/3}Mn_{1/3}Co_{1/3}O_2$ for the positive electrode active material, and kneading the positive electrode active material, graphite as a conductive agent, and polyvinylidene fluoride as a binder at a weight ratio of 85:10:5 for 30 min by using a kneader. The positive electrode mix was coated on both surfaces of an aluminum foil of 20 μm thickness.

On the other hand, a mixture of 70 wt % of a non-graphitizing carbon having d(002) of 0.36 nm or more and 30 wt % of four types of graphitizing carbons (with d(002) of 0.339 nm or more and less than 0.360 nm) each having a non-graphitizing carbon coating of different thickness was used as the negative electrode active material and, while using a graphite as a conductive agent and a polyvinylidene fluoride as a binder, the negative electrode active material, the conductive agent, and the binder were kneaded at a weight ratio of 90:5:5. The obtained negative electrode mix was coated on both surfaces of a copper foil of 10 μm thickness. Each of the prepared positive and negative electrodes was roll-molded by a press and then vacuum-dried at 120° C. for 12 hr.

The schematic view of the battery is shown in FIG. 1. After drying, the positive electrode 1 and the negative electrode 2 were wound by way of a separator 3 and inserted into a battery casing 4. Negative electrode collector lead pieces 6 were gathered and supersonically welded to a nickel negative electrode collector lead portion 8, and the negative electrode collector lead portion 8 was welded to the bottom of the battery casing 4. On the other hand, positive electrode collector lead pieces 5 were supersonically welded to an aluminum positive electrode collector lead portion 7 and then the positive electrode collector lead portion 7 was resistance welded to the battery lid 9. After pouring an electrolyte (1M $LiPF_6$/

EC:EMC=1:3), the battery lid 9 was sealed by caulking the battery casing 4, to obtain a battery. 11 is a safety valve, and 12 is a positive electrode terminal.

A gasket 12 was inserted between the upper end of the battery casing 4 and the battery lid 9. As described above, a 7 Ah class battery was manufactured. The batteries were charged/discharged at a charge/discharge rate of 10 C (1/10 hour rate of rated electric capacity) and discharge capacity retaining ratio up to 3000 cycles was calculated. The result is shown in Table 1.

TABLE 1

| Sample Name | Surface modification thickness (nm) | Capacity retaining ratio (%) (after 3000 cycle of high speed charge/discharge with no recess) |
|---|---|---|
| Comp. Example 1 | 0 | 30 |
| Comp. Example 2 | 1 | 30 |
| Example 1 | 10 | 75 |
| Example 2 | 30 | 78 |
| Example 3 | 100 | 70 |
| Comp. Example 3 | 200 | 50 |

As shown in Examples 1 to 3 of Table 1, it can be seen that a negative electrode mix using a graphitizing carbon with a coating thickness of 10 to 100 nm can provide a battery of high capacity retaining ratio over 70%. It is considered that the effect of the surface modification is not obtained at a thickness of 1 μm, and that the resistance of the material increases to worsen the discharge capacity retaining ratio at 200 μm or more.

For further improving the high rate cycle characteristics, the mixed negative electrode active material with the non-graphitizing carbon was investigated by using the graphitizing carbon with a modification thickness of 10 to 30 nm. The battery was manufactured under the same conditions as described above and the energy density was calculated. Further, in a state of SOC (State of Charge) 50%, currents at 1 C, 3 C, 5 C, 10 C, and 20 C were applied for 10 sec and a voltage at 10 sec for each of current values was measured to examine the power performance.

The power density was determined according to the equation: $P_0 = I_D \times V_D$ by using the end of discharge voltage ($V_D$) and a current value ($I_D$) when extrapolating a line of current/voltage characteristics of a battery to the end of discharge voltage. The specification, the initial energy density, and the initial energy density of the manufactured batteries were calculated, and charge/discharge was conducted at a charge/discharge rate of 10 C (1/10 hour rate of rated electric capacity) as high rate cycle characteristics, to calculate the discharge capacity retaining ratio after 3000 cycles. The result is shown in Table 2.

TABLE 2

| Sample Name | Non-graphitizing carbon:graphitizing carbon (wt %) | Pressed mix Density (g/cm³) | Irreversible capacity (%) |
|---|---|---|---|
| Comp. Example 4 | 100:0 | 1 | 20 |
| Comp. Example 5 | 95:5 | 1 | 20 |
| Example 4 | 90:10 | 1.03 | 19.65 |
| Example 5 | 70:30 | 1.08 | 18.95 |
| Example 6 | 50:50 | 1.14 | 18.25 |
| Comp. Example 6 | 40:60 | 1.16 | 17.9 |
| Comp. Example 7 | 40:60 (negative coating amount, 2.5 g/m² increased) | 1.16 | 17.9 |
| Comp. Example 8 | 40:60 (positive coating amount, 7 g/m² decreased) | 1.16 | 17.9 |

| Sample Name | −/+Capacity ratio | Initial energy density (Wh/kg) | Initial power density (W/kg) | Capacity retaining ratio (%) (after 3000 cycle of high speed charge/discharge with no recess) |
|---|---|---|---|---|
| Comp. Example 4 | 1.3 | 72 | 3500 | 83 |
| Comp. Example 5 | 1.28 | 72 | 3500 | 83 |
| Example 4 | 1.25 | 74 | 3530 | 82 |
| Example 5 | 1.13 | 78 | 3588 | 78 |
| Example 6 | 1.02 | 81 | 3642 | 76 |
| Comp. Example 6 | 0.97 | — | — | — |
| Comp. Example 7 | 1 | 82 | 3635 | 60 |
| Comp. Example 8 | 1 | 81 | 3697 | 55 |

As shown in Comparative Examples 4, 5 of Table 2, since the mixing amount of the graphitizing carbon was small, no expected effect could be obtained. However, as shown in Examples 4 to 6, by mixing the non-graphitizing carbon and the graphitizing carbon at a ratio of 90 to 50 wt % vs. 10 to 50 wt %, the negative electrode mix density was improved, the resistance was decreased, and the power density was improved as initial characteristics. Further, the energy density was improved by the decrease of the irreversible capacity.

On the other hand, when the mixing amount of the graphitizing carbon is increased to 60% or more, +/− capacity ratio was decreased to 1.0 or less when the coating amount of the positive and negative electrode mixes was constant at the minimum limit, and this cannot be utilized for the battery. Then, it may be considered to increase the negative electrode coating amount or decrease the positive electrode coating amount. However, as shown in Comparative Examples 7, 8, the energy density and the power density are decreased by the change of the coating amount and, further, lowering of the capacity retaining ratio after 3000 cycles of high speed charges/discharge cycle develops remarkably when the mixing amount is 60 wt % or more.

Therefore, the mixing ratio between the non-graphitizing carbon and the graphitizing carbon in the invention is preferably defined in the range as non-graphitizing carbon:graphitizing carbon=90 to 50 wt %:10 to 50 wt %, which is within a range of excellent high energy density, high power density and high rate cycle characteristics.

What is claimed is:
1. A lithium ion secondary battery comprising a positive electrode of absorbing/releasing lithium, a negative electrode of absorbing/releasing lithium and an electrolyte, wherein
the negative electrode has a negative electrode active material,
the negative electrode active material contains a non-graphitizing carbon and a graphitizing carbon which is coated on the surface with the non-graphitizing carbon,
the non-graphitizing carbon is in the range from 90 to 50 wt % and the graphitizing carbon is in the range from 10 to

50 wt % based on the total weight of the non-graphitizing carbon and the graphitizing carbon, with the total of them being 100%, and the average grain size of the graphitizing carbon is larger than the average grain size of the non-graphitizing carbon.

2. A lithium ion secondary battery according to claim 1, wherein the graphitizing carbon has a layer containing the non-graphitizing carbon on the surface.

3. A lithium ion secondary battery comprising a positive electrode of absorbing/releasing lithium, a negative electrode of absorbing/releasing lithium and an electrolyte, wherein the negative electrode has a negative electrode active material, the negative electrode active material contains a non-graphitizing carbon and a graphitizing carbon which is coated on the surface with the non-graphitizing carbon, the non-graphitizing carbon is in the range from 90 to 50 wt % and the graphitizing carbon is in the range from 10 to 50 wt % based on the total weight of the non-graphitizing carbon and the graphitizing carbon, with the total of them being 100%, the graphitizing carbon has a layer containing the non-graphitizing carbon on the surface, the thickness of the layer being from 10 nm to 100 nm.

4. A lithium ion secondary battery according to claim 3, wherein the average grain size of the graphitizing carbon is larger than the average grain size of the non-graphitizing carbon.

5. A lithium ion secondary battery comprising a positive electrode of absorbing/releasing lithium, a negative electrode of absorbing/releasing lithium and an electrolyte, wherein the negative electrode has a negative electrode active material, the negative electrode active material contains a non-graphitizing carbon and a graphitizing carbon which is coated on the surface with the non-graphitizing carbon, the non-graphitizing carbon is in the range from 90 to 50 wt % and the graphitizing carbon is in the range from 10 to 50 wt % based on the total weight of the non-graphitizing carbon and the graphitizing carbon, with the total of them being 100%, and the spacing d(002) of the non-graphitizing carbon is 0.360 nm or more and the spacing d (002) of the graphitizing carbon is 0.339 nm or more and less than 0.360 nm.

6. A lithium ion secondary battery according to claim 5, wherein the average grain size of the graphitizing carbon is larger than the average grain size of the non-graphitizing carbon.

7. A lithium ion secondary battery according to claim 5, wherein the graphitizing carbon has a layer containing the non-graphitizing carbon on the surface.

8. A lithium ion secondary battery according to claim 7, wherein the thickness of the layer is from 10 nm to 100 nm.

* * * * *